No. 765,148. PATENTED JULY 12, 1904.
P. P. PEACE.
PROCESS OF REMOVING ALCOHOLIC LIQUORS FROM EMPTY CASKS OR BARRELS.
APPLICATION FILED JAN. 27, 1902.
NO MODEL.
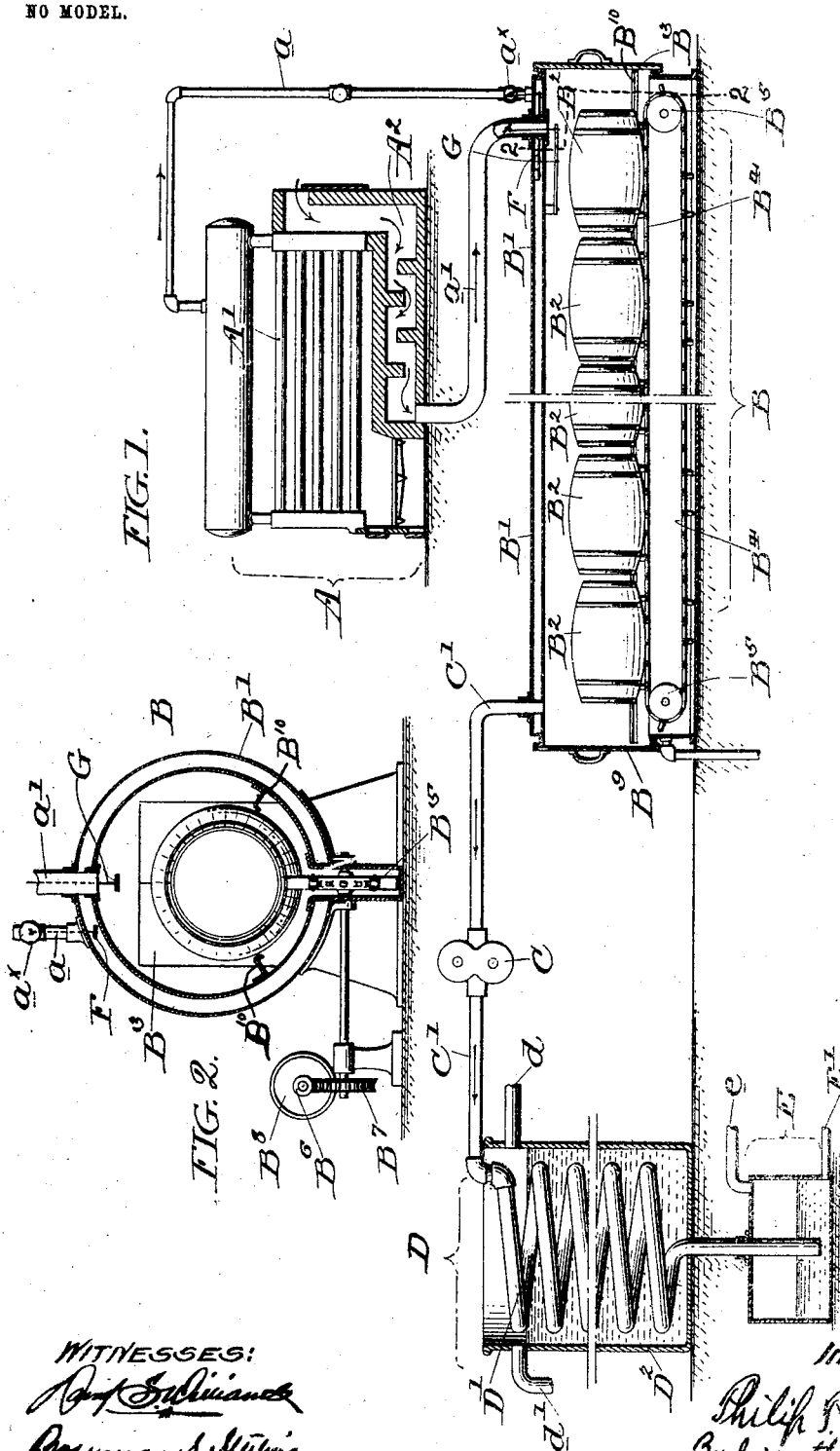

No. 765,148. Patented July 12, 1904.

UNITED STATES PATENT OFFICE.

PHILIP P. PEACE, OF PHILADELPHIA, PENNSYLVANIA, ASSIGNOR TO PHILADELPHIA EXTRACTING COMPANY, A CORPORATION OF NEW JERSEY.

PROCESS OF REMOVING ALCOHOLIC LIQUORS FROM EMPTY CASKS OR BARRELS.

SPECIFICATION forming part of Letters Patent No. 765,148, dated July 12, 1904.

Application filed January 27, 1902. Serial No. 91,319. (No specimens.)

*To all whom it may concern:*

Be it known that I, PHILIP P. PEACE, a citizen of the United States, residing at Philadelphia, in the county of Philadelphia and State of Pennsylvania, have invented certain new and useful Improvements in Processes of Removing Alcoholic Liquors from Empty Casks or Barrels, of which the following is a specification.

This invention relates to a process for recovering alcohol from casks or barrels which have contained alcoholic beverages, and comprises subjecting the barrels to a gaseous agent of a temperature not exceeding the boiling-point of water and not below the boiling-point of alcohol, whereby the alcohol may be removed accompanied by a minimum of aqueous moisture.

The further details of my improved process will be more fully understood by reference to the accompanying drawings, in which—

Figure 1 represents a diagrammatic view of the devices which I prefer to employ in carrying out my process. Fig. 2 represents a transverse vertical section taken on the plane of line 2 2 of Fig. 1.

Referring to the drawings by letters, A represents a heating device for supplying heated air for carrying out my present improved process, which heating device consists of a furnace above which is arranged a steam-generator $A'$, communicating by a suitable pipe $a$ with the jacket $B'$ of a cylinder B. A heating-chamber $A^2$ is arranged beneath the steam-generator $A'$ for supplying heated atmosphere through tube $a'$ to the interior of the cylinder B. The pipe $a$ is provided intermediate its length with a suitable valve $a^x$, suitably connected with an ordinary bimetallic thermostat F, arranged between the jacket $B'$ and the wall of the cylinder B. In practice this thermostat controls the amount of steam admitted to said jacket and prevents the same exceeding atmospheric pressure, or, in other words, prevents the heating-jacket raising the temperature of the atmosphere contained within the cylinder B above 212° Fahrenheit. A valve similar to valve $a^x$ is arranged within the pipe $a'$ and is similarly connected to a thermostat G, similar to the thermostat F arranged within the cylinder B, so that should the temperature of the atmosphere within said cylinder exceed the desired degree the supply of heated air will be automatically cut off. Extending longitudinally of the sides of the cylinder B are suitable guide-rails $B^9$ $B^9$, arranged to guide the barrels introduced into said cylinder, and the cylinder is provided with doors $B^3$ and $B^9$ at its opposite ends.

Arranged within the cylinder is an endless conveyer consisting of a suitable endless chain $B^4$, passed about pulleys $B^5$ $B^5$, one of said pulleys having its shaft extended and carrying a worm-gear $B^7$, meshing with the worm $B^6$, whose shaft is adapted to be actuated by any suitable driving-wheel $B^8$. A tube $C'$ leads from the opposite end of cylinder B from that with which the tube $a'$ communicates, said pipe $C'$ communicating with a condenser D of any preferred type. Said condenser preferably consists of a suitable coil $D'$, arranged within a receptacle $D^2$, supplied with a cooling medium by a pipe $d$, which cooling medium is preferably drained by a suitable pipe $d'$. The coil $D'$ preferably communicates at its discharge end with a receptacle E, which allows the non-condensible gases to pass off through the pipe $e$, while the condensed liquid may be drawn off through the pipe E.

In carrying out the process the door $B^3$ is opened and barrels $B^2$ are introduced one at a time onto the conveying-chain $B^4$, which chain is caused to travel during the introduction of the barrels until the cylinder B is filled. The door $B^3$ is then closed and heated air is supplied through pipe $a'$. Said air after passing in contact with the barrels, which barrels of course have their bung-holes left open for permitting action of the air on the interior of the barrels, passes out through pipe $C'$ under the action of a suction or vacuum pump C, arranged in the length of the pipe $C'$. The atmosphere passing out by pipe C is treated in the condenser D for recovering the alcohol, and the operation is continued as long as is found necessary for recovering all or the greater portion of the alcohol retained by the barrels.

By the present improved process I am enabled to recover alcohol to a great extent free from a diluent, and in order to secure this result care is exercised to prevent the heat supplied exceeding the boiling-point of water, so that while some aqueous moisture may be taken up the amount thereof will be comparatively small. The contact of the cylinder with steam enables the controlling of the temperature of the atmosphere within the cylinder, greater or less amount of steam being admitted to the jacket, according to the fluctuation in the degree of temperature of the heated air admitted to the cylinder.

Having thus fully described my invention, what I claim as new, and desire to secure by Letters Patent, is—

1. The process of recovering alcohol from casks comprising subjecting the casks to a non-aqueous gaseous agent of a temperature exceeding the boiling-point of alcohol, but below the boiling-point of water, and treating said gaseous agent which has been in contact with such casks for removing the alcohol therefrom.

2. The process of recovering alcohol from casks comprising subjecting the casks to a non-aqueous gaseous agent of a temperature exceeding the boiling-point of alcohol, but below the boiling-point of water, controlling the temperature of said non-aqueous gaseous agent by a second gaseous agent, and removing the alcohol from the first-mentioned gaseous agent after the same has been in contact with said casks.

In testimony whereof I affix my signature in presence of two witnesses.

PHILIP P. PEACE.

Witnesses:
WALTER W. CALMORE,
C. P. S. GARWOOD.